Figure 1:
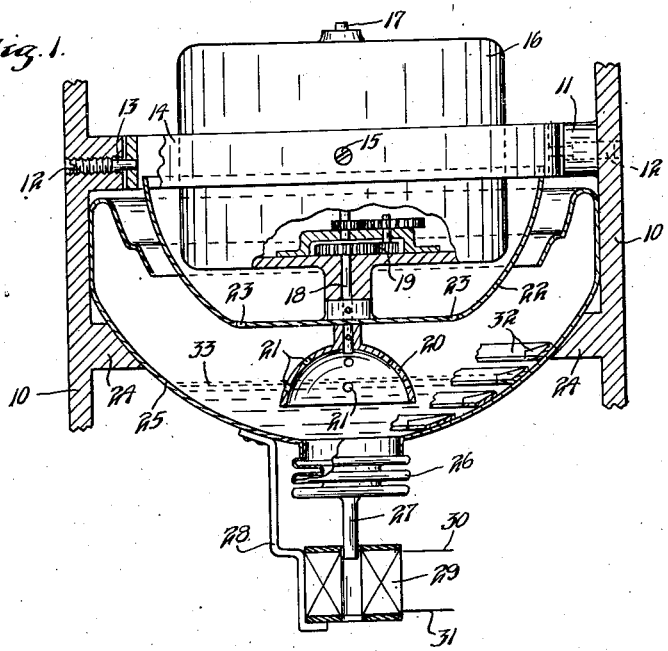

Oct. 14, 1947.   G. L. BORELL   2,428,925
GYROSCOPE CONSTRUCTION
Filed Jan. 29, 1944   2 Sheets-Sheet 1

Inventor
GEORGE L. BORELL

George H. Fisher
Attorney

Oct. 14, 1947.    G. L. BORELL    2,428,925
GYROSCOPE CONSTRUCTION
Filed Jan. 29, 1944    2 Sheets-Sheet 2
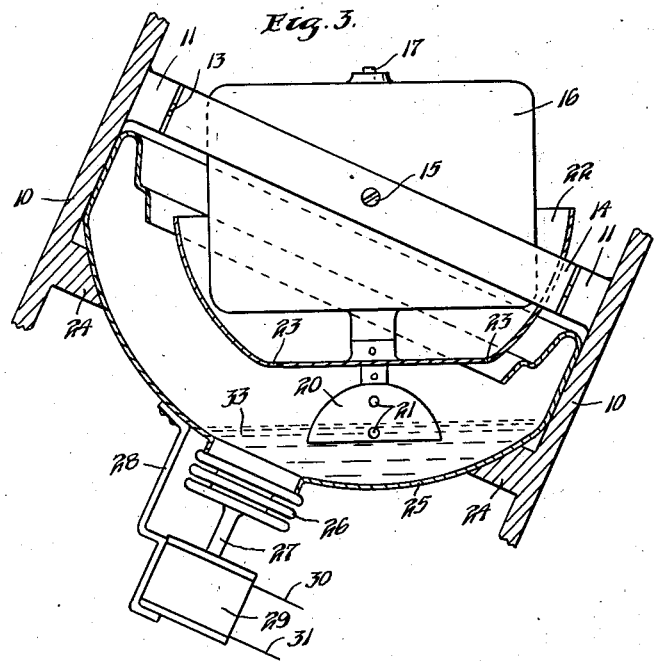
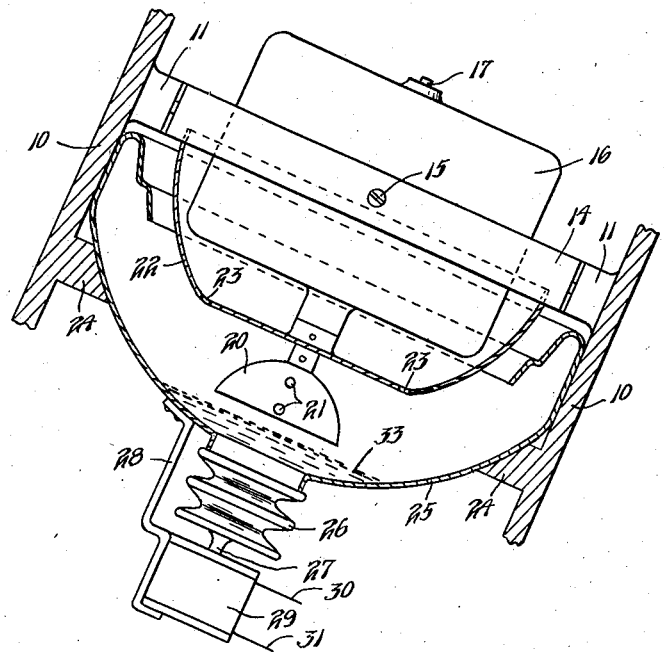
Inventor
GEORGE L. BORELL
By
George H. Fisher
Attorney Patented Oct. 14, 1947

2,428,925

UNITED STATES PATENT OFFICE 2,428,925

GYROSCOPE CONSTRUCTION

George L. Borell, Minneapolis, Minn., assignor to Minneapolis-Honeywell Regulator Company, Minneapolis, Minn., a corporation of Delaware Application January 29, 1944, Serial No. 520,276

20 Claims. (Cl. 74—5)

This invention relates to an improved gyroscope construction in which sturdiness, simplicity and durability are predominant features. Numerous high precision, close fitting, fragile parts associated with mechanical erectors or correctors of prior gyroscope constructions which require close periodic inspection, adjustment, repair, or replacement have been eliminated entirely without sacrifice of sensitivity, accuracy or dependability. Accordingly, the improved device of this invention is especially adapted for use in control units of aircraft or the like which may not conveniently be laid up. However, it will be apparent that employment of the device is not necessarily limited to this single field.

One of the principal objects of advantage and importance of the improved device resides in the provision of means for producing a simple, efficient and highly dependable device in which wear and failure of associated parts are reduced to a minimum. Additionally, improper functioning due to glazing, vibration, and the like, as in friction actuated constructions, is totally eliminated.

Another object of importance and advantage is the provision of means for greatly reducing construction cost by utilizing stamped or formed parts in the erector portion of the improved device and at the same time maintaining a high degree of dependability, accuracy and a long operative life.

A still further object of advantage and importance of the improved device of this invention resides in the provision of means for constantly tending to maintain the spinning axis of the gyroscope in a selected position relative to a horizontal liquid level and to correct instantly any movement of the axis or level from said relative position. The selected position here referred to may be perpendicular to the horizontal liquid level or some other angular position relative thereto.

Still another object of importance and advantage is the provision of means for utilizing the resistance of a static body of liquid upon a member operating therein for increasing or decreasing precession inducing pressure in ratio to the movement or tilt of the gyroscope axis or liquid level from their original relative positions. Provision is also made for eliminating all activating torque when such action is found to be desirable.

Still another object of advantage and importance resides in the provision of means for positioning a body of liquid in alignment with the erecting member of a gyroscope and providing means for maintaining said body of liquid substantially static regardless of the rotation of the erecting member therein.

An additional object of advantage and importance is the provision of means for shielding the balanced gyroscope casing from accidental splash and taking up such splash upon a rotatable member whereby unintentional precession of the gyroscope is prevented.

Figure 2:
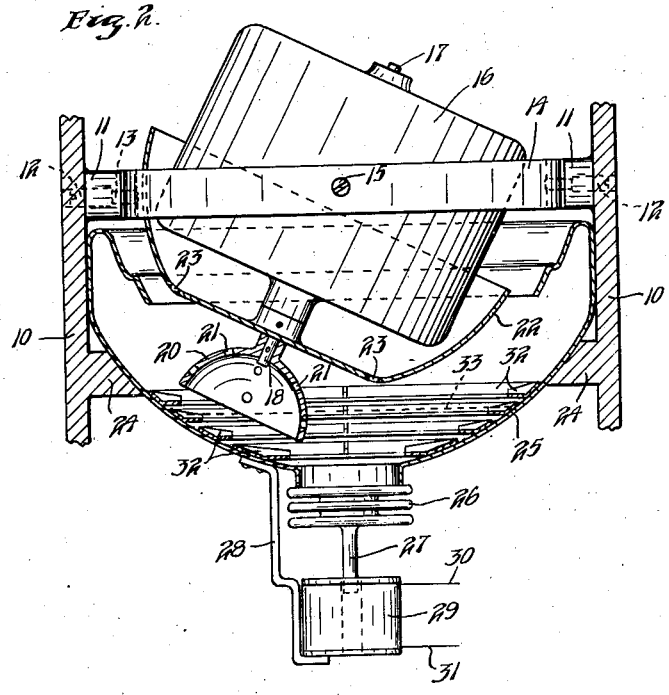

Aditional objects of advantage and importance will become apparent as the following detailed description progresses, reference being had to the accompanying drawing, wherein Figure 1 is an elevational view partly in section of a gyroscope construction which embodies the invention, portions thereof being broken away, Figure 2 is a similar view showing the gyroscope tilted, Figure 3 is also a similar view showing the frame tilted and the gyroscope in vertical position, and Figure 4 shows both frame and gyroscope tilted.

The reference numeral 10 indicates generally a frame which in the preferred embodiment of the invention is provided with a pair of bosses 11. The bosses indicated by the reference 11 project inwardly from the frame 10 in opposed relation to each other as is best shown in the drawing. Each boss is apertured as at 12 to receive a gudgeon pin 13. The gudgeon pins 13, 13 provide a means for pivotally supporting a Cardan ring 14 intermediate the bosses 11, 11. The Cardan ring, being pivotally mounted, is rotatable about an axis extending through the gudgeon pin 13, 13.

Positioned within the Cardan ring 14 and rotatable about an axis extending through lock screws 15 located on opposed sides of the Cardan ring 14 is a gyroscope 16. The gyroscope 16 is of well known construction and accordingly will not be here described in detail. It is to be noted, however, that the spinning axis of the gyroscope which extends longitudinally through the shaft 17 is normally vertical or perpendicular to the normal position of the Cardan ring as is best shown in Figure 1. However, it will be apparent that the spinning axis of the gyroscope need not be precisely perpendicular to the horizon or a liquid level but may be arranged at an acute or obtuse angle thereto. It will also be apparent that the gyroscope-Cardan ring assembly may rotate in any direction on their horizontal axes.

Extending downwardly from the gyroscope 16 is a driven shaft 18. The shaft 18 is driven by the gyroscope through a reduction gear train 19 as is best shown in Figure 1.

Secured to the lower end of the shaft 18, by any suitable means, and rotatable therewith is an impeller member 20. In the preferred embodiment of the device the impeller member 20 is shown to be cup shaped. However, it will be apparent that the member 20 may be variously shaped and may be formed of any suitable material such as screening, a metal stamping, a plastic or the like. The shaft 18 and the inverted cup shaped member 20 secured thereto are preferably driven at a relatively slow rate of speed to avoid eddying and to provide a constant resistance against the rotational movement thereof. The cup shaped member 20 may be provided with a plurality of holes 21, the function of which will be later explained.

Secured to the shaft 18 and rotatable therewith is a splash shield 22. The shield 22, which is positioned immediately above the inverted cup shaped member 20 as is clearly shown in the drawing, is preferably provided with a plurality of drain holes 23, 23. It will be apparent that shield 22 which rotates with the shaft 18 is also adapted to rotate about the horizontal axis with the gyroscope 16.

Secured within the frame 10 by any suitable means, such as for instance bracket 24, is a nonspill vessel 25. The vessel 25 is preferably provided with a rounded bottom portion and an inwardly and downwardly turned upper portion as is clearly shown in the drawing. An opening in the top of the vessel 25 is of sufficient size to receive the splash shield 22 which normally operates therein. The return on the upper portion of the vessel 25 prevents loss of liquid therefrom in the event the vessel is tilted or even if it is completely inverted.

Positioned on the bottom of the vessel 25 preferably at its lowest point, as shown in the drawing, and in communication with the interior thereof is a bellows member 26. The bellows member 26 is biased to a normal contracted position as best shown in Figures 1, 2, and 3. The lower portion of the bellows member 26 terminates in an armature member 27.

Disposed in alignment with the armature 27 and secured against movement therefrom by a bracket 28 is a solenoid 29. The solenoid 29 may be connected to any suitable source of power through the lead wires 30 and 31. Upon energization of solenoid 29 the armature 27 is moved into its attracted position, as shown in Figure 4, thereby expanding the bellows member 26 which movement lowers the liquid level in the vessel 25.

Positioned within the vessel 25 adjacent the lower portion thereof is a plurality of annular and radially disposed baffle plates 32. The baffle plates 32 are preferably spaced one from the other as is best shown in Figure 2 and are so arranged as to permit free movement of the cup shaped member 20 within the vessel 25. The baffle plates 32 function to prevent swirl, turbulence, and splashing of the liquid within the vessel. The liquid level indicated by the dotted line 33 may vary considerably without impairing the efficiency, accuracy or sensitivity of the improved device. The uppermost baffle plate 32 is shown at approximately the permitted high liquid level line, and the permitted low level is slightly above the lower edge of the member 20.

It will be apparent from the foregoing that the rotating member normally operates partly immersed in the liquid and that so long as the axis of rotation is at right angles to the level of the liquid a resistance equal or balanced on opposed portions of the member is exerted against rotational movement thereof. This torque is augmented by the plurality of aligned perforations or apertures in the member which also function as vents. In the event the right-angular relationship between the gyroscope axis and the liquid level becomes disrupted it follows that one side of the rotating member will be more deeply immersed in the liquid than the opposite side thereof. Consequently, as the member rotates in this misaligned position, a portion of the peripheral surface thereof, and the perforations carried thereby, will be rotating above the liquid level and a portion diametrically opposed thereto will be rotating beneath the liquid level. Thus the resistance to rotation will be unequal or unbalanced on opposed sides of the member resulting in an increased pressure being exerted against one side of the gyroscope axis and a decreased pressure against the opposite side thereof.

Operation

Operation of the improved device of this invention is as follows: The device as shown in Figure 1 is in normal operating position, that is the Cardan ring and liquid level are horizontal and the spinning axis of the gyroscope is perpendicular thereto. Assume now that the device is mounted in a craft and is in operation with the gyroscope rotor spinning and the cup shaped member rotating slowly in this normal position. It will be apparent that an equalized resistance is exerted against the member 20 at all points throughout its rotational movement. As the plane progresses on its flight, the gyroscope would tend to maintain its original position in space. However, the level of the liquid and the frame would be altered to conform to the horizon. If corrections were not made to maintain the spinning axis of the gyroscope perpendicular to the level of the liquid a definite tilt, as shown in Figure 2 would result. However, as soon as misalignment between the liquid level and the spinning axis takes place, the perforated cup shaped member is moved in the liquid to a tilted position disrupting the equalized resistance against its rotation. Thus, with the greater torque on its lower immersed side and a lighter torque on its upper side a pressure is exerted against the spinning axis at right angles to the direction of tilt. This torque causes the gyroscope to precess at right angles thereto or in a direction against the tilt. Consequently, the spinning axis is moved to a position perpendicular to the level of the liquid.

It will be apparent from the foregoing that the improved device of this invention functions to correct disturbance of the normal horizontal-perpendicular relation between the spinning axis of the gyroscope and the liquid level when the gyroscope in maintaining its original position is tilted in the frame as the frame moves to maintain a constant level position. The movement if unchecked would result in the parts assuming the positions shown in Figure 2. However, this relative movement between the associated parts is not permitted to take place. The slightest tilt of the gyroscope in relation to the liquid level immediately sets up an unbalanced torsional resistance which is greater on one side of the impeller, here shown as an inverted cup shaped member 20, than on the opposed side thereof, thus exerting a torque causing gyroscopic precession to an erect position.

Assume now in the course of level travel the craft in which the improved gyroscope is mounted pitches or rolls to disturb the parallel relationship between the level of the liquid and the Cardan ring. Such a movement would bring the parts into the positions shown in Figure 3. In this event it is to be noted that the normal relationship between the liquid level and the spinning axis of the gyroscope remains normal. Thus it will be apparent that the improved device applies correcting torque to the gyroscope only on relative movement between the liquid level and the spin axis, and is not influenced by other conditions.

Under certain conditions it has been found desirable to prevent erection of the gyroscope to normal operating relation with the liquid level. For instance, assume that the craft in which the device is positioned turns or banks. This circular movement would set up a centrifugal force at right angles to the force of gravity, consequently, the liquid level would assume an angular position with respect to the horizon. Correction of the perpendicular-level relationship from this angular level would result in a false or incorrect erection similar to that in which the parts are shown in Figure 4. Accordingly, provision is made in the form of the magnetically operated bellows member for lowering the level of the liquid to a point below the lowermost edge of the rotatable member. Accordingly, during such maneuvers, turns and banks, the gyroscope may retain its original position regardless of the level assumed by the liquid.

It is to be noted that means in the form of a rotatable shield has been provided to protect the gyroscope casing from splash or the like lodging thereon. Without the shield, particles of oil or other liquid lodging on the casing would tend to upset its balance thus causing inaccuracy and inefficient operation. However, the rotatable shield overcomes this difficulty. In the event of liquid becoming lodged on the rotating shield the unbalanced portion is not held at one point. Rather the lodged portion rotates with the shield and thus tends to correct any unbalanced condition.

It will be apparent from the foregoing that herein is provided a simple, inexpensive and highly efficient and dependable gyroscope erector adapted to operate accurately over long periods of time without the necessity of mechanical repairs or inspections. Furthermore, the improved device of this invention is designed and adapted to withstand rough handling, abuse and neglect over long periods of active use and yet to maintain an exceptionally high degree of sensitivity and responsiveness.

It will also be apparent to those skilled in the art to which the improved device of this invention appertains that numerous changes in design and construction may be made without departing from the spirit or scope of the invention. Accordingly, the patent granted hereon is not to be limited to the precise embodiment here disclosed or in any other manner except as may be necessitated by the terminology of the appended claims when given the range of equivalents to which they may be entitled.

I claim as my invention:

1. In a gyroscope: a rotor; a casing therefor; a support for pivotally mounting said casing, said support including a vessel containing a body of liquid; a member extending from said casing in the direction of said liquid and rotatable about an axis having a selected normal angular relationship to the normal surface of said liquid and to the axis of said rotor, pivotal movement of said casing with respect to said support changing the angular relation between said axis and said surface, said member including a portion adapted for frictional engagement with said fluid when immersed therein; means reversibly causing relative movement between said liquid and said portion of said member, whereby said frictional engagement may be alternatively caused and prevented; and means for causing rotation of said rotor and of said rotatable means.

2. In combination: a gyroscope, having liquid reaction means for maintaining the spin axis thereof vertical comprising a stationary vessel of liquid and a mechanically actuated member, carried by the gyroscope for displacement on departure of the latter from the vertical, and normally reactively engaging said liquid; and means, independent of displacement of said member due to said departure of the gyroscope from vertical, for preventing reaction between said member and said liquid.

3. In a gyroscope, a vessel of liquid, a gyroscope rotor disposed with its axis normally perpendicular to the normal surface of said liquid, liquid resistance responsive means driven by said rotor and normally immersed at least in part in said liquid for receiving torques in accordance with the resistance presented by said liquid, and means carried at least in part by said vessel for altering the relative location of said responsive means and said surface of said liquid, so as to prevent interengagement therebetween.

4. In combination: a gyroscope, having liquid reaction means for maintaining the spin axis thereof vertical comprising a stationary vessel of liquid and a mechanically actuated member, carried by the gyroscope for displacement on departure of the latter from the vertical, and normally reactively engaging said liquid; and means for bringing about relative movement between said member and said liquid to alternatively cause and prevent reaction between said member and said liquid.

5. In combination: a gyroscope, having liquid reaction means for maintaining the spin axis thereof vertical comprising a stationary vessel of liquid and a mechanically actuated member, carried by the gyroscope for displacement on departure of the latter from the vertical, and normally reactively engaging said liquid; and means for withdrawing liquid from said vessel and returning the same thereto so as to alternatively prevent and cause reaction between said member and said liquid.

6. In a gyroscope: a rotor having a normally vertical spin axis; a support mounting said rotor for pivotal movement about a pair of horizontal axes, said support including a vessel, containing a body of liquid, in normal alignment with said vertical axis; a rotatable member driven by said rotor and normally immersed at least in part in said body of liquid, said member and said body of liquid being disposed for relative movement with respect to said horizontal axes; and means, carried in part by said support, for alternatively withdrawing from said vessel such a quantity of said liquid as to completely uncover said member and replacing said quantity of liquid to re-immerse said member.

7. In a gyroscope, a rotor operably positioned within a casing, said casing being mounted for limited rotation about horizontal axes, means adjacent said casing for maintaining a body of liquid in spaced relation therewith, a rotatable member driven by said rotor and extending into said liquid body, and means interposed between said casing and said liquid body whereby splash from said body is prevented from lodging on said casing.

8. In a gyroscope, a rotor operably positioned within a casing, said casing being mounted for limited rotational movement about horizontal axes upon which it is balanced, means adjacent said casing for maintaining a body of liquid in spaced relation therewith, a rotatable member driven by said rotor and extending into said liquid body, and rotatable means interposed between said liquid body and said casing whereby splash from said liquid body is prevented from lodging on said casing thereby disrupting its balance.

9. In a gyroscope, erection means tending to maintain the spin axis of said gyroscope in a normal relation to a horizontal plane, comprising: a support for said gyroscope including a vessel of liquid; rotatable means driven by said gyroscope and normally immersed in said liquid, means carried by said support and operable to separate said rotatable means and said liquid body; said liquid body being disposed to exert a balanced torque against rotational movement of said rotatable means during the conditions of said normal relation of said gyroscope to said horizontal plane, and to exert an unbalanced torque when said normal relation is disrupted, whereby to cause precession to reestablish said normally operable relation, said rotatable means being arranged for maintaining operational efficiency of said erection means throughout substantial vertical variations in the location of the surface of said liquid body relative to said rotatable means.

10. In combination: a gyroscope, having liquid reaction means for maintaining the spin axis thereof vertical comprising a stationary vessel of liquid and a mechanically actuated member, carried by the gyroscope for displacement on departure of the latter from the vertical, and normally reactively engaging said liquid; and means, independent of displacement of said member due to said departure of the gyroscope from vertical, for preventing reaction between said member and said liquid; said means including a resilient bellows inserted in the wall of said vessel and means for causing change in the volume enclosed by said bellows.

11. In a gyroscope having a vertical spin axis, a frame, means for mounting said gyroscope for limited movement about horizontal axes in said frame, a liquid holding vessel positioned in said frame in alignment with said spinning axis and spaced from said gyroscope, a body of liquid contained within said vessel, a member rotatable about an axis extending from said gyroscope in a direction having components along said horizontal axes, said member entering said vessel, a portion of said member being normally immersed in said liquid for reactive interengagement therewith, means for causing rotation of said member, and means carried by said vessel for alternatively lowering and raising the level of said liquid relative to the normally immersed portion of said rotatable member, the arrangement being such that the reactive forces between said liquid and said rotatable member have components active about said horizontal axes.

12. In a gyroscope, a rotor, a support, means universally mounting said rotor in said support, a vessel containing a body of liquid, a rotatable member driven by said rotor and entering said body of liquid, the axis of said rotatable member being normally perpendicular to the surface of said liquid whereby a balanced torque yieldingly resists rotational movement thereof, displacement means carried by said support and operable to withdraw said body of liquid from and return it to association with said rotatable members, and means for selectively operating said displacement means.

13. In combination: a gyroscope, having liquid reaction means for maintaining the spin axis thereof vertical comprising a stationary vessel of liquid and a mechanically actuated member carried by the gyroscope for displacement on departure of the latter on the vertical and normally reactively engaging said liquid; and means, independent of displacement of said member due to said departure of the gyroscope from vertical, for preventing reaction between said member and said liquid, said means including a volumetrically adjustable member in communication with said vessel and enclosing a normal volume of said liquid, and solenoid means effective to alter the volume of liquid enclosed therein.

14. In a gyroscope construction, a rotor operably positioned within a casing, said casing being mounted for limited rotation about horizontal axes, means adjacent said casing for maintaining a body of liquid in spaced relation therewith, a rotatable member driven by said rotor and extending into said body of liquid, and concentrically disposed means limiting turbulence of said liquid caused by operation of said rotatable member therein.

15. In a gyroscope construction, a rotor operably positioned within a casing, said casing being mounted for limited rotation about horizontal axes, means adjacent said casing for maintaining a body of liquid in spaced relation therewith, a rotatable member driven by said rotor and extending into said body of liquid, means formed and disposed for shielding said casing from splash, and means projecting radially inwardly from said liquid maintaining means for limiting eddy currents created in said liquid by action of said rotatable member therein.

16. In a gyroscope construction, a rotor, a casing mounted for limited rotational movement and housing said rotor, means adjacent said casing for maintaining a body of liquid in spaced relation therewith, a rotatable member associated with said casing and extending into said body of liquid, said rotatable member being movable with said casing relative to said body of liquid, a reduction gear train carried by said casing and operably disposed intermediate said rotor and said rotatable member, and a splash shield secured to said rotatable member and movable therewith.

17. In a gyroscope, erection means tending to maintain the spinning axis of said gyroscope in an operable position relative to a horizontal plane and comprising a substantially semi-spherical vessel, a quantity of liquid positioned in said vessel, the upper portion of said vessel being turned inwardly and downwardly, said turned portion being spaced from the interior surface of said vessel, a rotatably driven member extending into said vessel and said liquid, and annular baffle means concentrically disposed in said vessel tending to maintain said liquid static.

18. In a gyroscope, erection means tending to maintain the spinning axis of said gyroscope in an operable position relative to a horizontal plane, a non-spill vessel, a quantity of liquid positioned in said vessel, a return rim on the upper portion of said vessel adapted to contain said liquid if said vessel is tilted or inverted, a rotatable member extending into said vessel and said liquid, and means in communication with the interior of said vessel operable to remove liquid to and from said vessel.

19. In a gyroscope, erection means tending to maintain the spinning axis of said gyroscope in an operable position relative to a horizontal plane, a non-spill vessel, a quantity of liquid positioned in said vessel, a return rim on the upper portion of said vessel adapted to contain said liquid if said vessel is tilted or inverted, a rotatable member driven by said gyroscope and extending into said vessel and said liquid, means in said vessel tending to maintain said liquid static, a splash shield positioned intermediate said liquid and said gyroscope and being formed and disposed to prevent splash of said liquid from unbalancing said gyroscope.

20. In a gyroscope construction, a frame, a casing mounted for limited rotational movement about horizontal axes in said frame, a rotor operably positioned in said casing, the spinning axis of said rotor being normally angular to a horizontal plane, a reduction gear train carried by said casing and driven by said rotor, a shaft journalled in said casing and projecting therefrom, said shaft being driven by said gear train, an impeller member secured to said shaft adjacent the free end thereof and rotatable therewith, a non-spill vessel secured in said frame in housing association with said shaft and impeller member, a quantity of liquid positioned in said vessel and engaging said impeller member, a plurality of radially and annularly disposed baffles in said vessel, a rotatable splash shield secured to said shaft intermediate said impeller and said casing, and solenoid actuated means for withdrawing liquid from said vessel.

GEORGE L. BORELL.

REFERENCES CITED

The following references are of record in the file of this patent:

UNITED STATES PATENTS

| Number | Name | Date |
|---|---|---|
| 1,780,192 | Jackson | Nov. 4, 1930 |
| 1,653,885 | Van Guilder | Dec. 27, 1927 |

FOREIGN PATENTS

| Number | Country | Date |
|---|---|---|
| 636,828 | France | Jan. 16, 1928 |
| 837,057 | France | Oct. 12, 1937 |
| 785,614 | France | Jan. 28, 1935 |